(12) United States Patent
Chu et al.

(10) Patent No.: US 11,600,886 B2
(45) Date of Patent: Mar. 7, 2023

(54) BATTERY PACK (71) Applicant: CONTEMPORARY AMPEREX TECHNOLOGY CO., LIMITED, Fujian (CN)

(72) Inventors: Yannan Chu, Fujian (CN); Mu Qian, Fujian (CN); Jinqing Ji, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 198 days.

(21) Appl. No.: 17/124,477

(22) Filed: Dec. 16, 2020

(65) Prior Publication Data
US 2021/0104801 A1 Apr. 8, 2021

Related U.S. Application Data

(63) Continuation of application No. PCT/CN2019/075824, filed on Feb. 22, 2019.

(30) Foreign Application Priority Data

Dec. 29, 2018 (CN) .......................... 201811637272.7

(51) Int. Cl.
*H01M 50/249* (2021.01)
*H01M 50/143* (2021.01)
(Continued)

(52) U.S. Cl.
CPC ....... *H01M 50/249* (2021.01); *H01M 10/625* (2015.04); *H01M 10/6556* (2015.04); *H01M 10/6561* (2015.04); *H01M 50/143* (2021.01); *H01M 50/317* (2021.01); *H01M 50/383* (2021.01)

(58) Field of Classification Search
None
See application file for complete search history.

(56) References Cited

U.S. PATENT DOCUMENTS

| 2004/0185339 A1* | 9/2004 | Jones | H01M 50/20 429/177 |
| 2010/0021810 A1* | 1/2010 | Zhu | H01M 10/625 429/185 |

(Continued)

FOREIGN PATENT DOCUMENTS

| CN | 1141095 A | 1/1997 |
| CN | 101867029 A | 10/2010 |

(Continued)

*Primary Examiner* — Lisa S Park
(74) *Attorney, Agent, or Firm* — Scully Scott Murphy & Presser (57) ABSTRACT

The present application provides a battery pack. The battery pack comprises a case, a cavity structure being provided in the bottom of the case; and a plurality of battery cells, the plurality of battery cells being stacked at the bottom of the case, and an end surface, facing the bottom of the case, of each of the battery cells being provided with an explosion-proof valve, wherein a structural layer, facing the explosion-proof valve, of the bottom of the case is provided with a weak area, and gas in the battery cell during thermal runaway of any battery cell may be collected via the weak area into the cavity structure and then is discharged.

19 Claims, 4 Drawing Sheets

(51) Int. Cl.
  *H01M 50/317*   (2021.01)
  *H01M 50/383*   (2021.01)
  *H01M 50/242*   (2021.01)
  *H01M 50/103*   (2021.01)
  *H01M 50/209*   (2021.01)
  *H01M 50/271*   (2021.01)
  *H01M 50/291*   (2021.01)
  *H01M 50/30*    (2021.01)
  *H01M 10/625*   (2014.01)
  *H01M 10/6556*  (2014.01)
  *H01M 10/6561*  (2014.01)

(56) References Cited

U.S. PATENT DOCUMENTS

| | | |
|---|---|---|
| 2011/0117401 A1 | 5/2011 | Lee et al. |
| 2015/0318518 A1* | 11/2015 | Kim .............. H01M 50/143 429/176 |
| 2016/0099451 A1 | 4/2016 | Murai et al. |
| 2016/0204404 A1* | 7/2016 | Shimizu .............. H01M 50/342 429/82 |
| 2016/0254504 A1 | 9/2016 | Kim et al. |
| 2017/0346050 A1* | 11/2017 | Morioka ............. H01M 50/138 |
| 2020/0152941 A1* | 5/2020 | Wynn ................ H01M 50/271 |

FOREIGN PATENT DOCUMENTS

| | | |
|---|---|---|
| CN | 203690383 U | 7/2014 |
| CN | 105489812 A | 4/2016 |
| CN | 105900259 A | 8/2016 |
| CN | 106098976 A | 11/2016 |
| CN | 106684287 A | 5/2017 |
| CN | 206595314 U | 10/2017 |
| CN | 107331807 A | 11/2017 |
| CN | 207967135 U | 10/2018 |
| EP | 2325922 A1 | 5/2011 |
| EP | 3062361 A1 | 8/2016 |
| JP | 2007-027011 A | 2/2007 |

* cited by examiner

BATTERY PACK

CROSS-REFERENCE TO RELATED APPLICATIONS

This application is a continuation of International Application No. PCT/CN2019/075824, filed on Feb. 22, 2019, which claims priority to Chinese Patent Application No. 201811637272.7, filed on Dec. 29, 2018. The disclosures of the aforementioned applications are hereby incorporated by reference in their entireties.

TECHNICAL FIELD

The present application relates to the technical field of batteries, and particularly relates to a battery pack.

BACKGROUND

In recent years, the emergence of new energy vehicles has played a huge role in promoting social development and environmental protection, and a power battery pack, which serves as a rechargeable battery, is a power source of the new energy vehicle, and is widely used in the field of new energy vehicles.

The battery pack will produce some side reactions under short circuits, overcharging, etc., and then produce a certain amount of gas at a certain temperature, and when the produced gas increases to a certain extent, it will lead to a thermal runaway phenomenon, and then an explosion-proof valve arranged towards a vehicle cabin is exploded, and ejects a high-pressure and high-temperature gas towards the vehicle cabin, thereby affecting the safety in the vehicle cabin.

SUMMARY

The present application aims at providing a battery pack so as to ease the technical problem that in the prior art, a high-temperature and high-pressure gas produced during thermal runaway of a battery pack is ejected towards a vehicle cabin, which affects the safety of people in the vehicle cabin.

The present application provides a battery pack, including:

a case, a cavity structure being provided in the bottom of the case; and a plurality of battery cells, the plurality of battery cells being stacked at the bottom of the case, and an end surface, facing the bottom of the case, of each of the battery cells being provided with an explosion-proof valve, a structural layer, facing the explosion-proof valve, of the bottom of the case is provided with a weak area, and gas in the battery cell during thermal runaway of any battery cell may be collected by the weak area into the cavity structure and then is discharged.

Further, the case includes:

a bottom cavity, the bottom cavity including an upper plate and a lower plate, the upper plate and the lower plate are spaced apart in a height direction of the case, and form the cavity structure, the end surface, facing the upper plate, of each of the battery cells is provided with the explosion-proof valve, and the structural layer, facing the explosion-proof valve, of the upper plate is provided with the weak area; and a plurality of supporting plates, arranged at intervals between the upper plate and the lower plate.

Further, a first flow channel is formed between the adjacent supporting plates, and gas produced by the thermal runaway of the battery cell may enter the corresponding first flow channel through the weak area.

Further, the case further includes:

a plurality of side end members, all the side end members being sequentially connected end to end to form a through accommodating cavity in an enclosed manner, and an opening of the accommodating cavity being capped with the bottom cavity so as to form the case; and at least one of the side end members is provided with an exhaust hole, each first flow channel is in communication with the corresponding exhaust hole, and the gas in the first flow channel may be discharged to the outside of the case by means of the corresponding exhaust hole.

Further, each of the supporting plates is provided with a plurality of communication holes, and all the first flow channels are in communication with one another by means of the communication holes.

Further, the side end member includes a first side end member and a second side end member, the first side end member and the second side end member being arranged opposite each other; and the first flow channel is located between the first side end member and the second side end member, and the first flow channel extends in a direction pointing to the second side end member from the first side end member.

Further, a first gap is provided between an end surface, facing the first end member, of the supporting plate and the first side end member, and the first gap(s) is/are in communication with one another to form a second flow channel; and the second flow channel is in communication with each of the first flow channels.

Further, the first side end member is provided with the exhaust hole.

Further, the side end member further includes a third side end member and a fourth side end member, the first side end member, the second side end member, the third side end member and the fourth side end member being sequentially connected end to end to form the through accommodating cavity in an enclosed manner;

a second gap is provided between at least one of the second side end member, the third side end member and the fourth side end member and an end surface of the corresponding supporting plate, and the second gap(s) is/are in communication with one another to form a third flow channel; and the second flow channel and each of the first flow channels are in communication with the third flow channel.

Further, the upper plate is provided with a one-way valve, a gas inlet of the one-way valve being in communication with the cavity structure.

Further, a flow guide member is arranged between the upper plate and the battery cell, a flow guide gas channel is arranged in the position, corresponding to the explosion-proof valve, of the flow guide member, and the flow guide member is made of a flame-resistant material.

Further, the weak area is arranged corresponding to the flow guide gas channel.

Further, the battery pack further includes:

a protective plate, arranged in an inner surface of the lower plate, the protective plate is arranged corresponding to the weak area, and the protective plate is made of a flame-resistant material.

Further, the battery pack further includes a flame-resistant bag, the flame-resistant bag is internally provided with a flame-resistant medium, and the flame-resistant bag is located in the cavity structure, and is arranged corresponding to the weak area.

Further, the battery pack further includes:

a sealing member, configured to seal the exhaust hole, the sealing member is arranged to open in response to an increase of pressure in the cavity structure.

The beneficial effects of the present application lie in that the present application provides a battery pack. The battery pack includes a case and a plurality of battery cells arranged at the bottom of the case, the plurality of cells are stacked together; in addition, an end surface, facing the bottom of the case, of each of the cells is provided with an explosion-proof valve; specifically, a cavity structure is provided in the bottom of the case; a structural layer, facing the explosion-proof valve, of the bottom of the case is provided with a weak area; and gas in the battery cell during thermal runaway of any battery cell may be collected by the weak area into the cavity structure and then is discharged. Since the explosion-proof valve is arranged on the end surface, facing the bottom of the case, of each cell, when one or more cells inside the case are subjected to thermal runaway, a high-temperature and high-pressure gas produced by the thermal runaway of the cell is ejected toward the bottom of the case other than in a direction of a vehicle cabin, thereby guaranteeing the safety of people in the vehicle cabin. The high-temperature gas produced by the thermal runaway of the cell may be collected by the weak area, at the bottom of the case, into the cavity structure and discharged into the outside environment. In such a design structure, an ejection direction of gas at the explosion-proof valve during the thermal runaway of the cell is changed by means of an inverted cell, such that ejection in the direction of the vehicle cabin is avoided and the safety of people in the vehicle cabin is guaranteed. Meanwhile, the cavity structure is provided at the bottom of the case so as to guide the gas produced during the thermal runaway of the battery cell into the outside environment, thereby further improving the safety of the battery pack.

BRIEF DESCRIPTION OF THE DRAWINGS

In order to more clearly illustrate technical solutions in the particular embodiments of the present application or in the prior art, a brief introduction to the accompanying drawings required for the description of the particular embodiments or the prior art will be provided below. Obviously, the accompanying drawings in the following description are some of the embodiments of the present application, and those of ordinary skill in the art may still derive other drawings from these accompanying drawings without any creative effort.

DESCRIPTION OF REFERENCE SIGNS

1—Battery cell;
2—Case;
20—weak area;
21—Bottom cavity;
211—Upper plate;
212—Lower plate;
213—flame-resistant bag;
22—Side end member;
221—First side end member;
2211—Exhaust hole;
222—Second side end member;
223—Third side end member;
224—Fourth side end member;
225—Bus hole;
23—Supporting plate;
231—Communication hole;
3—Sealing member;
4—First flow channel;
5—Second flow channel;
6—Third flow channel;
7—One-way valve;
8—Flow guide member;
81—Flow guide gas channel;
9—Protective plate.

DESCRIPTION OF EMBODIMENTS

The technical solutions of the present application will be described below clearly and completely in conjunction with the accompanying drawings. Apparently, the described embodiments are merely some of, rather than all of, the embodiments of the present application. Based on the embodiments of the present application, all the other embodiments obtained by those of ordinary skill in the art without any creative effort fall within the scope of protection of the present application.

In the description of the present application, it should be noted that orientations or positional relationships indicated by the terms "inside", "outside", etc. are based on the orientations or positional relationships shown in the accompanying drawings and are only for facilitating the description of the present application and simplifying the description, rather than indicating or implying that a device or element referred to must have a particular orientation or be constructed and operated in a particular orientation, and therefore will not be interpreted as limiting the present application.

In the description of the present application, it should be noted that unless otherwise explicitly specified and defined, the terms "mounting", "connecting", and "connection" should be understood in a broad sense, for example, it may be a fixed connection, a detachable connection, or an integrated connection; may be a mechanical connection, or an electric connection; and may be a direct connection, an indirect connection via an intermediate medium, or communication between interiors of two elements. For those of ordinary skill in the art, the specific meanings of the above terms in the present application could be understood according to specific circumstances.

Specifically, a battery pack comprises a case 2 and a plurality of battery cells 1 accommodated inside the case 2, the case 2 is divided into an upper part and a lower part, and the upper part and the lower part are hermetically connected. Further, the plurality of battery cells 1 are stacked together. When the battery cell 1 operates, a large amount of heat may be produced due to discharge of a positive electrode and a negative electrode of the battery cell 1 and a chemical reaction of an electrolytic solution inside the battery cell 1, and heat produced by discharge of the positive electrode and the negative electrode of the battery cell 1 and the chemical reaction of the electrolytic solution inside the battery cell 1 under short circuit, overcharging, etc. is far beyond a normal value, thereby causing thermal runaway and producing a large amount of high-temperature and high-pressure gas.

As shown in FIG. 1, FIG. 2, FIG. 4 and FIG. 5, in this embodiment, the end surface, facing the bottom of the case 2, of each of the battery cells 1 arranged inside the case 2 is provided with an explosion-proof valve, specifically, a cavity structure is provided in the bottom of the case 2, a structural layer, facing the explosion-proof valve, of the bottom of the case 2 is provided with a weak area 20, and gas in the battery cell 1 during thermal runaway of any battery cell 1 may be collected by the weak area 20 into the cavity structure and then is discharged. Since the explosion-proof valve is arranged on the end surface, facing the bottom of the case 2, of each of the battery cells 1, when one or more battery cells 1 inside the case 2 are subjected to thermal runaway, a high-temperature and high-pressure gas produced by the thermal runaway of the battery cell 1 is ejected toward the bottom of the case 2 other than in a direction of a vehicle cabin, thereby guaranteeing the safety of people in the vehicle cabin. The high-temperature gas produced by the thermal runaway of the battery cell 1 may be collected by the weak area 20, at the bottom of the case 2, into the cavity structure and discharged into the outside environment. In such a design structure, an ejection direction of the gas during the thermal runaway of the battery cell 1 is changed by changing the position of the explosion-proof valve, such that ejection in the direction of the vehicle cabin is avoided and the safety of people in the vehicle cabin is guaranteed. Meanwhile, the cavity structure is provided at the bottom of the case 2 so as to guide the gas produced by the thermal runaway of the battery cell 1 into the outside environment, thereby further improving the safety of the battery pack.

Figure 4:
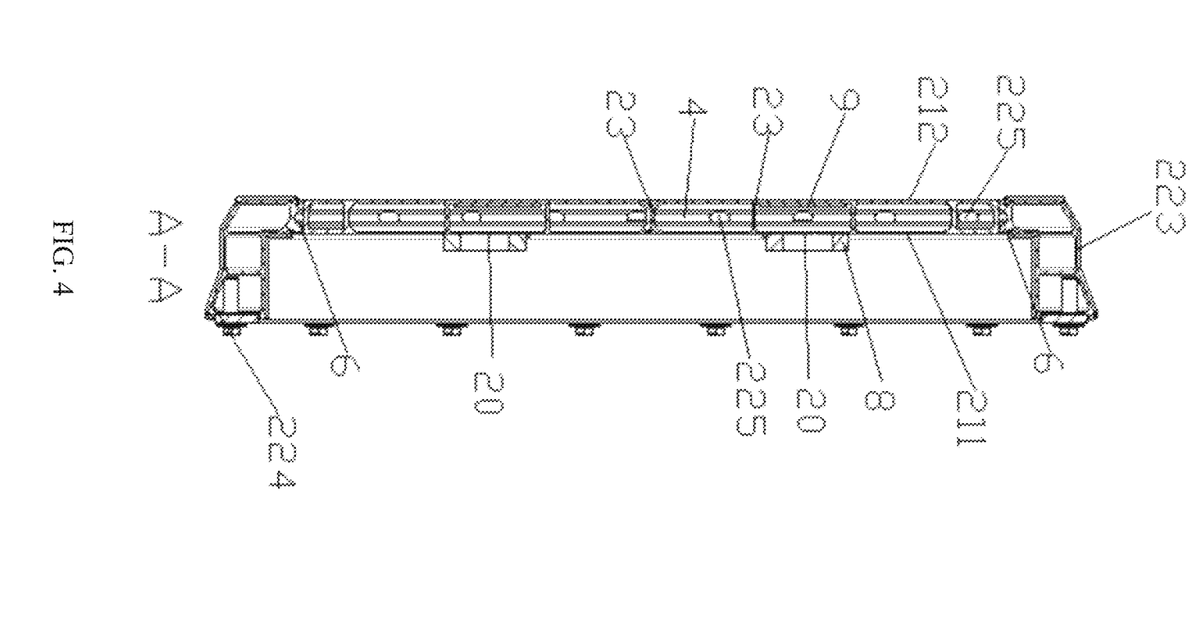
FIG. 4 is a schematic structural diagram in an A-A direction in FIG. 3.
Figure 5:
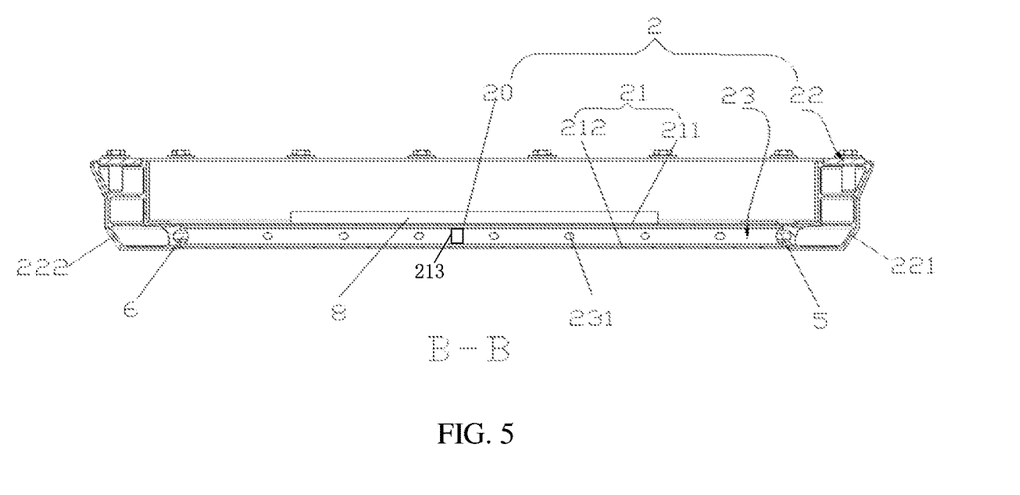
FIG. 5 is a schematic structural diagram in a B-B direction in FIG. 3.

As shown in FIG. 4 and FIG. 5, further, the case 2 comprises a bottom cavity 21, specifically, the bottom cavity 21 comprises an upper plate 211 and a lower plate 212 which are spaced apart in a height direction, the upper plate 211 and the lower plate 212 form the cavity structure, and the plurality of stacked battery cells 1 may be directly connected to the upper plate 211 in a manner of bonding, bolting, etc. In this embodiment, to improve structural strength of the bottom cavity 21, and prevent, after the battery cell 1 is placed, the deformation of the bottom cavity 21 from affecting smoothness of discharging gas by the cavity structure, a plurality of supporting plates 23 are arranged at intervals between the upper plate 211 and the lower plate 212, and the supporting plate 23 may improve the structural strength of the bottom cavity 21. Further, a first flow channel 4 is formed between the adjacent supporting plates 23, and the gas produced by the thermal runaway of the battery cell 1 may enter the corresponding first flow channel 4 through the weak area 20, and the supporting plate 23 guarantees that the whole case 2 may support the weight of the battery cell 1, and also guarantees that the gas is normally discharged during the thermal runaway of the battery cell 1 at the same time.

As shown in FIG. 4, the first flow channel 4 may be formed between the adjacent supporting plates 23, and certainly, the first flow channel 4 can also be arranged separately. In this embodiment, for guaranteeing that the gas may be discharged within safety time and improving safety, preferably, each supporting plate 23 is provided with a plurality of communication holes 231, all the first flow channels 4 are in communication with one another by means of the communication holes 231, that is, the gas produced during the thermal runaway of any one or more battery cells 1 may spread into other first flow channels 4 along a corresponding first flow channel 4, such that space for accommodating the gas is expanded, a gas pressure may be rapidly reduced, and explosion caused by an excessive gas pressure due to rapid accumulation of the gas is avoided.

Further, the case 2 further comprises a plurality of side end members 22, all the side end members 22 are sequentially connected end to end to form a through accommodating cavity in an enclosed manner, and an opening of the accommodating cavity is capped with the bottom cavity 21 so as to form the case 2, wherein at least one of the side end members 22 is provided with an exhaust hole 2211, each of the first flow channels 4 is in communication with the corresponding exhaust hole 2211, and the gas in the first flow channel 4 may be discharged to the outside of the case 2 by means of the corresponding exhaust hole 2211. For a corresponding relationship between the first flow channel 4 and the exhaust hole 2211, each first flow channel 4 may correspond to one exhaust hole 2211, or the plurality of first flow channels 4 may correspond to one exhaust hole 2211 as long as gas in each first flow channel 4 may be guaranteed to be discharged by means of the exhaust hole 2211.

Figure 1:
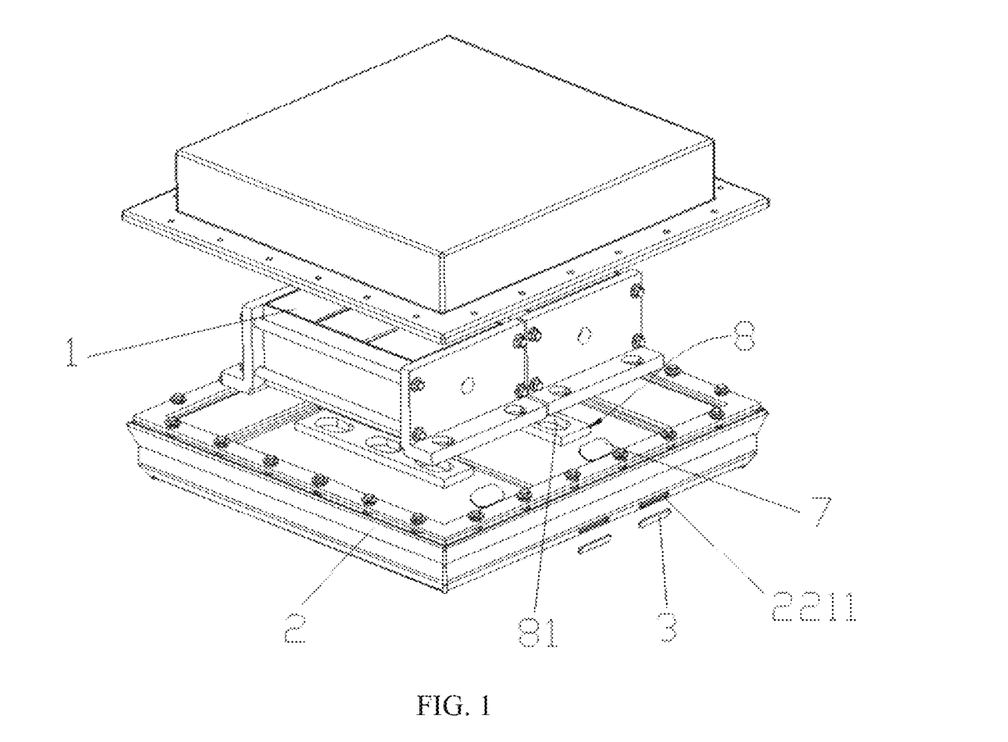
FIG. 1 is an exploded view of a battery pack provided by an embodiment of the present application.

As shown in FIG. 1, the exhaust hole 2211 may be in direct communication with the outside environment. In this embodiment, for preventing dust, moisture, etc. of the outside environment from entering the battery pack, the battery pack further comprises a sealing member 3 for sealing the exhaust hole 2211, and the sealing member 3 is arranged to open in response to an increase of pressure in the cavity structure. The sealing member 3 may be a one-way valve 7, and when the pressure in the cavity structure is greater than a set value, the one-way valve 7 is opened. The sealing member 3 may be a low-strength structure, and after the pressure in the cavity structure reaches a certain pressure, the low-strength structure is damaged and therefore opened. The sealing member 3 may be made of plastic, metal, etc., in addition, the sealing member 3 may be arranged in the exhaust hole 2211 in a manner of bonding, clamping, etc., for guaranteeing that the sealing member 3 may rapidly open in response to the increase of pressure in the cavity structure of the exhaust hole 2211, in this embodiment, preferably, the sealing member 3 is bound to the exhaust hole 2211, and when gas in the cavity structure is greater than a bonding force, the sealing member 3 is opened.

One or more exhaust holes 2211 may be provided, and the specific number of exhaust holes 2211 may be set according to the design and specific model of the battery pack as long as it is guaranteed that gas in the cavity structure of the bottom cavity 21 may be discharged within specified time. In this embodiment, the number of the exhaust holes 2211 is not specifically defined.

The upper plate 211 and the lower plate 212 may be connected to the supporting plate 23 in a manner of bonding, clamping, welding, etc., and the side end members 22, as well as the side end member 22 and the bottom cavity 21 may be connected together in a manner of bonding, clamping, welding, etc. In this embodiment, for guaranteeing the overall structural strength of the case 2, preferably, the upper plate 211, the lower plate 212 and the supporting plate 23 are integrally formed.

Figure 2:
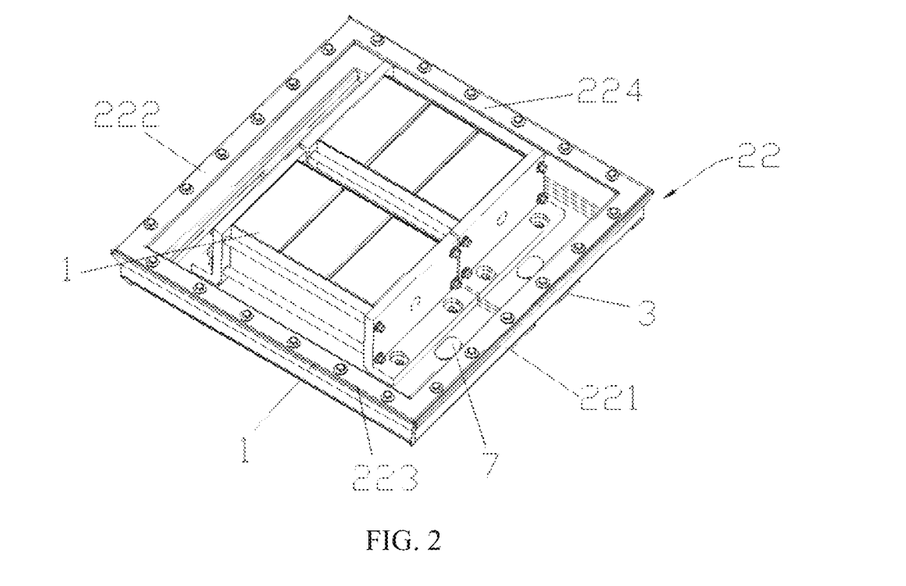
FIG. 2 is a schematic structural diagram of connection between a cell and a case provided by an embodiment of the present application.

As shown in FIG. 2 and FIG. 5, specifically, the side end member 22 comprises a first side end member 221 and a second side end member 222, and the first side end member 221 and the second side end member 222 are arranged opposite each other. With further reference to FIG. 4, any opening direction of the first flow channel 4 may not face a direction of the exhaust hole 2211. In this embodiment, for improving fluidity of gas in the first flow channel 4 and discharging gas in the cavity structure as soon as possible, further, the first side end member 221 is provided with the exhaust hole 2211, the first flow channel 4 is located between the first side end member 221 and the second side end member 222, and the first flow channel 4 extends in a direction pointing to the second side end member 222 from the first side end member 221.

In this embodiment, for further expanding space for accommodating the gas, rapidly reducing a gas pressure, and guaranteeing the safety of the battery pack, a first gap is provided between the end surface, facing the first end member 221, of the supporting plate 23 and the first side end member 221, the first gap(s) is/are in communication with one another to form a second flow channel 5, and the second flow channel 5 is in communication with each first flow channel 4.

Specifically, the first gap may be formed by indentation of the inner surface of the first side end member 221, or formed by indentation of the end surface of the supporting plate 23 corresponding to the first side end member 221, or formed by indentations of the first side end member and the supporting plate. In this embodiment, a forming manner of the first gap is not specifically defined.

As shown in FIG. 2 and FIG. 4, the side end member 22 further comprises a third side end member 223 and a fourth side end member 224, and the first side end member 221, the second side end member 222, the third side end member 223 and the fourth side end member 224 are sequentially connected end to end to form the through accommodating cavity in an enclosed manner. In this embodiment, for further expanding the space for accommodating the gas and improving the safety of the battery pack, specifically, a second gap is provided between at least one of the second side end member 222, the third side end member 223 and the fourth side end member 224 and the end surface of the corresponding supporting plate 23, the second gap(s) is/are in communication with one another to form a third flow channel 6, and the second flow channel 5 and each of the first flow channels 4 are in communication with the third flow channel 6.

In this embodiment, the second gap is formed in the same manner as the first gap, which will not be repeated herein.

The side end member 22 may be of a plate-shaped structure. In this embodiment, as shown in FIG. 5, the side end member 22 is of a hollowed structure, and the side end member 22 is provided with a bus hole 225 so that the second flow channel 5 is in communication with the hollowed structure inside the side end member 22 by means of the bus hole 225. Furthermore, for expanding the space for accommodating the gas, the hollowed structures of all the side end members 22 are in communication with one another. The exhaust hole 2211 is arranged in an outer side surface of the side end member 22.

Figure 3:
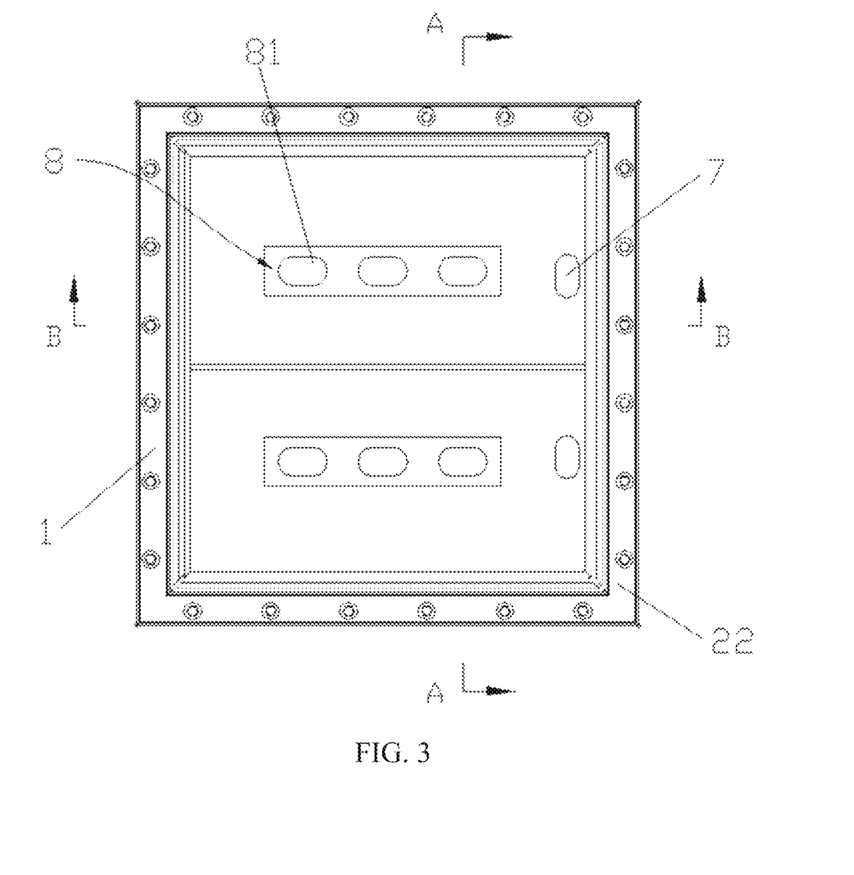
FIG. 3 is a schematic structural diagram of connection between a flow guide member and the case in FIG. 1.

As shown in FIG. 1 and FIG. 3, further, each battery cell 1 may be directly connected to the upper plate 211 so as to guarantee that gas produced by thermal runaway of the battery cell 1 may flow into the cavity structure of the bottom cavity 21. In this embodiment, a flow guide member 8 is further arranged between the upper plate 211 and the battery cell 1, a flow guide gas channel 81 is arranged in the position, corresponding to the explosion-proof valve, of the flow guide member 8, gas ejected from the explosion-proof valve may completely flow into the cavity structure of the bottom cavity 21 under the action of guiding of the flow guide gas channel 81, thereby guaranteeing safety during gas discharge, and for guaranteeing the safety, the flow guide member 8 is made of a flame-resistant material.

As shown in FIG. 4, in this embodiment, gas produced by the thermal runaway of the battery cell 1 has a very high temperature and may damage the structure of the bottom cavity 21. For further guaranteeing that the gas produced by the thermal runaway of the battery cell 1 completely flows into the cavity structure of the bottom cavity 21, a flame-resistant protective plate 9 is arranged on the inner surface of the lower plate 212, and specifically, the protective plate 9 is arranged corresponding to the weak area 20.

In this embodiment, the flow guide member 8 and the protective plate 9 may be made of mica plates, rock wool, etc., which will not be specifically defined herein.

As shown in FIG. 1, FIG. 2 and FIG. 3, the gas produced by the thermal runaway of the battery cell 1 may completely flow into the cavity structure of the bottom cavity 21, and then flow to the outside environment by means of the exhaust hole 2211 of the side end member 22. When the thermal runaway condition of the battery cell 1 is serious, the amount of produced gas exceeds a unit flow amount of the exhaust hole 2211, for guaranteeing the safety of the battery pack and a vehicle, in this embodiment, the upper plate 211 is provided with a one-way valve 7, a gas inlet of the one-way valve 7 is in communication with the cavity structure, and when gas produced in the cavity structure of the bottom cavity 21 cannot be discharged by means of the exhaust hole 2211 within specified unit time, that is, a gas pressure in the cavity structure exceeds a bearable gas value, at this time, the gas in the cavity structure of the bottom cavity 21 may also flow out of the one-way valve 7 at the same time, thereby improving the safety.

In this embodiment, for guaranteeing that the one-way valve 7 may be opened only when a gas pressure value in the cavity structure of the bottom cavity 21 exceeds the bearable gas pressure value, specifically, a set opening pressure of the one-way valve 7 is not smaller than a set value of pressure produced by the gas accommodated in the cavity structure of the bottom cavity 21, a specific structure of the one-way valve 7 is not defined herein, and a one-way valve 7 which meets the above opening condition can be applied to the battery pack.

A substance discharged from the explosion-proof valve by the battery cell 1 may bring a flame, for further improving the safety performance of the battery pack, the cavity structure is further internally provided with a flame-resistant bag, the flame-resistant bag is internally provided with a flame-resistant medium, and the flame-resistant bag is located in the cavity structure, and is arranged corresponding to the weak area 20. When the flame enters, along with the gas, the cavity structure from the weak area 20, the flame comes into contact with the flame-resistant medium and cannot spread to other parts in the cavity structure.

It should be finally noted that the above embodiments are only used for illustrating rather than limiting the technical solutions of the present application; although the present application has been described in detail with reference to the foregoing embodiments, it should be understood by those of ordinary skill in the art that the technical solutions specified in the foregoing embodiments could still be modified, or some or all of the technical features thereof may be equivalently replaced; and these modifications or replacements do not make the essence of corresponding technical solutions depart from the scope of the technical solutions of the embodiments of the present application.

What is claimed is:

1. A battery pack, comprising:
   a case, a cavity structure being provided in the bottom of the case;
   a plurality of battery cells, the plurality of battery cells being stacked at the bottom of the case, and an end surface, facing the bottom of the case, of each of the battery cells being provided with an explosion-proof valve; and
   a flame-resistant bag;
   wherein a structural layer, facing the explosion-proof valve, of the bottom of the case is provided with a weak area, and gas in the battery cell during thermal runaway of any battery cell may be collected via the weak area into the cavity structure and then is discharged; and
   wherein the flame-resistant bag is internally provided with a flame-resistant medium, and the flame-resistant bag is located in the cavity structure, and is arranged corresponding to the weak area.

2. The battery pack according to claim 1, wherein the case comprises:
   a bottom cavity, the bottom cavity comprising an upper plate and a lower plate,
   wherein the upper plate and the lower plate are spaced apart in a height direction of the case, and form the cavity structure, the end surface, facing the upper plate, of each of the battery cells is provided with the explosion-proof valve, and the structural layer, facing the explosion-proof valve, of the upper plate is provided with the weak area; and
   a plurality of supporting plates, arranged at intervals between the upper plate and the lower plate.

3. The battery pack according to claim 2, wherein a first flow channel is formed between adjacent supporting plates of the plurality of supporting plates, and gas produced by the thermal runaway of the battery cell may enter a corresponding first flow channel through the weak area.

4. The battery pack according to claim 3, wherein the case further comprises:
   a plurality of side end members, each of the plurality of side end members being sequentially connected end to end to form a through accommodating cavity in an enclosed manner, and an opening of the accommodating cavity being capped with the bottom cavity so as to form the case; and
   wherein at least one of the side end members is provided with an exhaust hole, the first flow channel is in communication with the corresponding exhaust hole to the first flow channel, and gas in the first flow channel may be discharged to the outside of the case via the corresponding exhaust hole.

5. The battery pack according to claim 3, wherein each of the supporting plates is provided with a plurality of communication holes, and all the first flow channels are in communication with one another by means of the communication holes.

6. The battery pack according to claim 4, wherein the plurality of side end members comprise a first side end member and a second side end member, the first side end member and the second side end member being arranged opposite each other; and
   the first flow channel is located between the first side end member and the second side end member, and the first flow channel extends in a direction pointing to the second side end member from the first side end member.

7. The battery pack according to claim 6, wherein first gaps are provided between end surfaces, facing the first end member, of the plurality of supporting plates and the first side end member, and the first gaps are in communication with one another to form a second flow channel; and
   the second flow channel is in communication with each of the first flow channels.

8. The battery pack according to claim 7, wherein the first side end member is provided with the exhaust hole.

9. The battery pack according to claim 7, wherein the side end member further comprises a third side end member and a fourth side end member, the first side end member, the second side end member, the third side end member and the fourth side end member being sequentially connected end to end to form the through accommodating cavity in an enclosed manner;
   a second gap is provided between at least one of the second side end member, the third side end member and the fourth side end member, and an end surface of the corresponding supporting plate, and the second gap is in communication with one another to form a third flow channel; and
   the second flow channel and each of the first flow channels are in communication with the third flow channel.

10. The battery pack according to claim 2, wherein the upper plate is provided with a one-way valve, a gas inlet of the one-way valve being in communication with the cavity structure.

11. The battery pack according to claim 2, wherein a flow guide member is arranged between the upper plate and the plurality of battery cells, a flow guide gas channel is arranged in a position, corresponding to the explosion-proof valve, of the flow guide member, and the flow guide member is made of a flame-resistant material.

12. The battery pack according to claim 11, wherein the weak area is arranged corresponding to the flow guide gas channel.

13. The battery pack according to claim 2, further comprising:
   a protective plate, arranged in an inner surface of the lower plate, wherein the protective plate is arranged corresponding to the weak area, and the protective plate is made of a flame-resistant material.

14. The battery pack according to claim 4, further comprising:
   a sealing member, configured to seal the exhaust hole, wherein the sealing member is arranged to open in response to an increase of pressure in the cavity structure.

15. A vehicle, comprising a battery pack, wherein the battery pack comprising:
   a case, a cavity structure being provided in the bottom of the case;
   a plurality of battery cells, the plurality of battery cells being stacked at the bottom of the case, and an end surface, facing the bottom of the case, of each of the battery cells being provided with an explosion-proof valve; and
   a flame-resistant bag;
   wherein a structural layer, facing the explosion-proof valve, of the bottom of the case is provided with a weak area, and gas in the battery cell during thermal runaway of any battery cell may be collected via the weak area into the cavity structure and then is discharged; and
   wherein the flame-resistant bag is internally provided with a flame-resistant medium, and the flame-resistant bag is located in the cavity structure, and is arranged corresponding to the weak area.

16. The vehicle according to claim 15, wherein the case comprises:
   a bottom cavity, the bottom cavity comprising an upper plate and a lower plate,
   wherein the upper plate and the lower plate are spaced apart in a height direction of the case, and form the cavity structure, the end surface, facing the upper plate, of each of the battery cells is provided with the explosion-proof valve, and the structural layer, facing the explosion-proof valve, of the upper plate is provided with the weak area; and
   a plurality of supporting plates, arranged at intervals between the upper plate and the lower plate.

17. The vehicle according to claim 16, wherein a first flow channel is formed between the adjacent supporting plates, and gas produced by the thermal runaway of the battery cell may enter the corresponding first flow channel through the weak area.

18. The vehicle according to claim 16, wherein the upper plate is provided with a one-way valve, a gas inlet of the one-way valve being in communication with the cavity structure.

19. The vehicle according to claim 16, wherein a flow guide member is arranged between the upper plate and the battery cell, a flow guide gas channel is arranged in a position, corresponding to the explosion-proof valve, of the flow guide member, and the flow guide member is made of a flame-resistant material.

* * * * *